US008250192B2

(12) United States Patent
Bowerman

(10) Patent No.: US 8,250,192 B2
(45) Date of Patent: Aug. 21, 2012

(54) DATA SERVER ADMINISTRATION USING A CHATBOT

(75) Inventor: Guy Frederick Bowerman, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 11/871,927

(22) Filed: Oct. 12, 2007

(65) Prior Publication Data
US 2009/0100160 A1 Apr. 16, 2009

(51) Int. Cl.
*G06F 15/173* (2006.01)
(52) U.S. Cl. ........ 709/223; 709/204; 709/206; 709/224; 709/225; 709/226
(58) Field of Classification Search ............ 709/223
See application file for complete search history.

(56) References Cited

U.S. PATENT DOCUMENTS

| | | | |
|---|---|---|---|
| 6,473,786 B1 * | 10/2002 | Scouras et al. | 709/206 |
| 7,039,654 B1 | 5/2006 | Eder | |
| 2001/0034732 A1 * | 10/2001 | Vorholt et al. | 707/10 |
| 2002/0059045 A1 | 5/2002 | Tackett et al. | |
| 2003/0182391 A1 * | 9/2003 | Leber et al. | 709/217 |
| 2003/0217105 A1 | 11/2003 | Zircher et al. | |
| 2003/0220972 A1 | 11/2003 | Montet et al. | |
| 2004/0039636 A1 | 2/2004 | Feldes et al. | |
| 2004/0122924 A1 * | 6/2004 | Coryell et al. | 709/223 |
| 2005/0102065 A1 | 5/2005 | McBride et al. | |
| 2006/0026231 A1 | 2/2006 | Degenhardt et al. | |
| 2006/0150119 A1 | 7/2006 | Chesnais et al. | |
| 2006/0259555 A1 | 11/2006 | Hassounah et al. | |
| 2006/0282431 A1 * | 12/2006 | McBride et al. | 707/6 |
| 2007/0143485 A1 | 6/2007 | Da Palma et al. | |

OTHER PUBLICATIONS

Leonhardt, M.D., L. Tarouco, R.M. Vicari, E.R. Santos, and M. Dos Santos Da Silva, "Using Chatbots for Network Management Training through Problem-based Oriented Education", Proceedings of the Seventh IEEE International Conference on Advanced Learning Technologies (ICALT 2007), Jul. 2007, pp. 845-847.
TOPCMM Software, "123 Flash Chat Server Software", User Manual, Version 6.7, Jul. 13, 2007, 79 pp.

* cited by examiner

*Primary Examiner* — Firmin Backer
*Assistant Examiner* — Natisha Cox
(74) *Attorney, Agent, or Firm* — Janaki K. Davda; Konrad Raynes & Victor LLP

(57) ABSTRACT

Provided are techniques for data server administration. Under control of a chatbot in real time, a command is received from a user for administering a data server in a natural language format. It is determined whether the data server is to be contacted to process the command. In response to determining that the data server is to be contacted, session information is retrieved to identify the data server to be contacted, the command in the natural language format is converted into one or more data server administration Application Programming Interface (API) calls, the one or more data server administration API calls to the data server are issued, and information about processing of the command is provided to the user.

15 Claims, 7 Drawing Sheets

```
Bowerman: help
chatbot: DSA Bot revision 0.0.1

Usage:
add server servername [machine] [port] [user] [passwd]
call task task_arguments # call the task() function
check extents # check dbspace extents
checkpoint # issue a checkpoint
delete server servername # delete specified server
list servers # list the servers you administer
email user@xx.ibm.com command
feedback your feedback
h[elp]
list dbspaces # summary of dbspaces
list servers # list your defined data servers
server servername # set current data server Bowerman: add server logos_1110 logos 9089 informix mypassword
chatbot: Server logos_1110 added.
Current server: logos_1110

Bowerman: list spaces
chatbot: Dbspaces:
DbsNum  Name      Size     Free     Used %   Flags
1       rootdbs   537 MB   466 MB   13.15    N--B
2       datadbs   195 MB   187 MB   4.21     N--B
3       data2     195 MB   195 MB   0.09     N--B
4       docspace  1.91 GB  119 MB   93.92    N-BB
```

Bowerman: list servers
chatbot: Defined servers:
Server: marsh_1110
Machine: marsh:1529
DBA: informix Server: logos_1110
Machine: logos:9089
DBA: informix Server: marsh_1110_drda
Machine: marsh:1529
DBA: informix Bowerman: server marsh_1110
chatbot: Current server: marsh_1110

Bowerman: check extents
chatbot: Validating extents for Space 'rootdbs' ...
Validation of extents for Space 'rootdbs' succeeded Bowerman: checkpoint
chatbot: Checkpoint Completed

Chatbot: Fred authenticated, type Help for a list of commands

Fred     : administer hr_instance

Chatbot: Current instance set to hr_instance

Fred     : list chunks

Chatbot : Chunk status:

Chunk 1, Dbspace 1, Offset 0, Size 100Mb, Free 126 pages, Path: c:\ifmxdata\hr_instance\rootdbs_dat.000

Chunk 2, Dbspace 2, Offset 0, Size 200Mb, Free 5377 pages, Path: c:\ifmxdata\hr_instance\datadbs_dat.000

Fred     :  add chunk to dbspace 1 path c:\ifmxdata\hr_instance\rootchk1 offset 0 size 100 Mb Chatbot: Chunk of size 100Mb added to dbspace 1

Fred     : administer payroll

Chatbot: You are not in the valid administrator list for the payroll instance

Fred     : administer test_inst

Chatbot: Current instance set to test_inst

Fred     : take instance offline

Chatbot: instance test_inst has been taken offline

FIG. 4

DATA SERVER ADMINISTRATION USING A CHATBOT

BACKGROUND

1. Field

Embodiments of the invention relate to data server administration using a chatbot.

2. Description of the Related Art

Data server administration includes managing relational data server configuration settings (e.g., storage, memory, and logs) and retrieving diagnostic information. Remote data server administration describes the administration of data servers remotely via a network connection, for example, a remote login session or via a web browser. Data servers that provide an administration Application Programming Interface (API) may be administered remotely using dedicated standalone programs (e.g., standalone data server administration applications) or web applications. Standalone programs lack the flexibility of World Wide Web ("Web") applications, which may be executed from a standard browser running on a machine coupled to a network to which the data server is also coupled. However, Web applications require the user to run a browser and lack the flexibility and accessibility of a purely text based interface. If a user has a command session on a machine that the data server is installed on, the data server typically supplies a set of command line utilities to administer the data server. Remote standalone data server administration applications sometimes provide an SQL command interface that enables the user to enter SQL commands. However, not all data servers support administration of the server itself via SQL commands. Even in cases in which a standalone data server administration application does connect to a data server that does support data server administration via SQL, the standalone data server administration application lacks the flexibility of switching between data servers with simple commands.

Thus, there is a need in the art for improved data server administration.

SUMMARY OF EMBODIMENTS OF THE INVENTION

Provided are a method, computer program product, and system for data server administration. Under control of a chatbot in real time, a command is received from a user for administering a data server in a natural language format. It is determined whether the data server is to be contacted to process the command. In response to determining that the data server is to be contacted, session information is retrieved to identify the data server to be contacted, the command in the natural language format is converted into one or more data server administration Application Programming Interface (API) calls, the one or more data server administration API calls to the data server are issued, and information about processing of the command is provided to the user.

BRIEF DESCRIPTION OF THE DRAWINGS

Referring now to the drawings in which like reference numbers represent corresponding parts throughout:

FIGS. 3A and 3B illustrate an example dialog in which configuration is performed in accordance with certain embodiments.

FIG. 4 illustrates an example dialog following a connection by user "Fred" in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments enable data server administration via a chatbot. A chatbot may be described as a computer program that communicates with users via voice and/or text on an instant message network.

Figure 1:
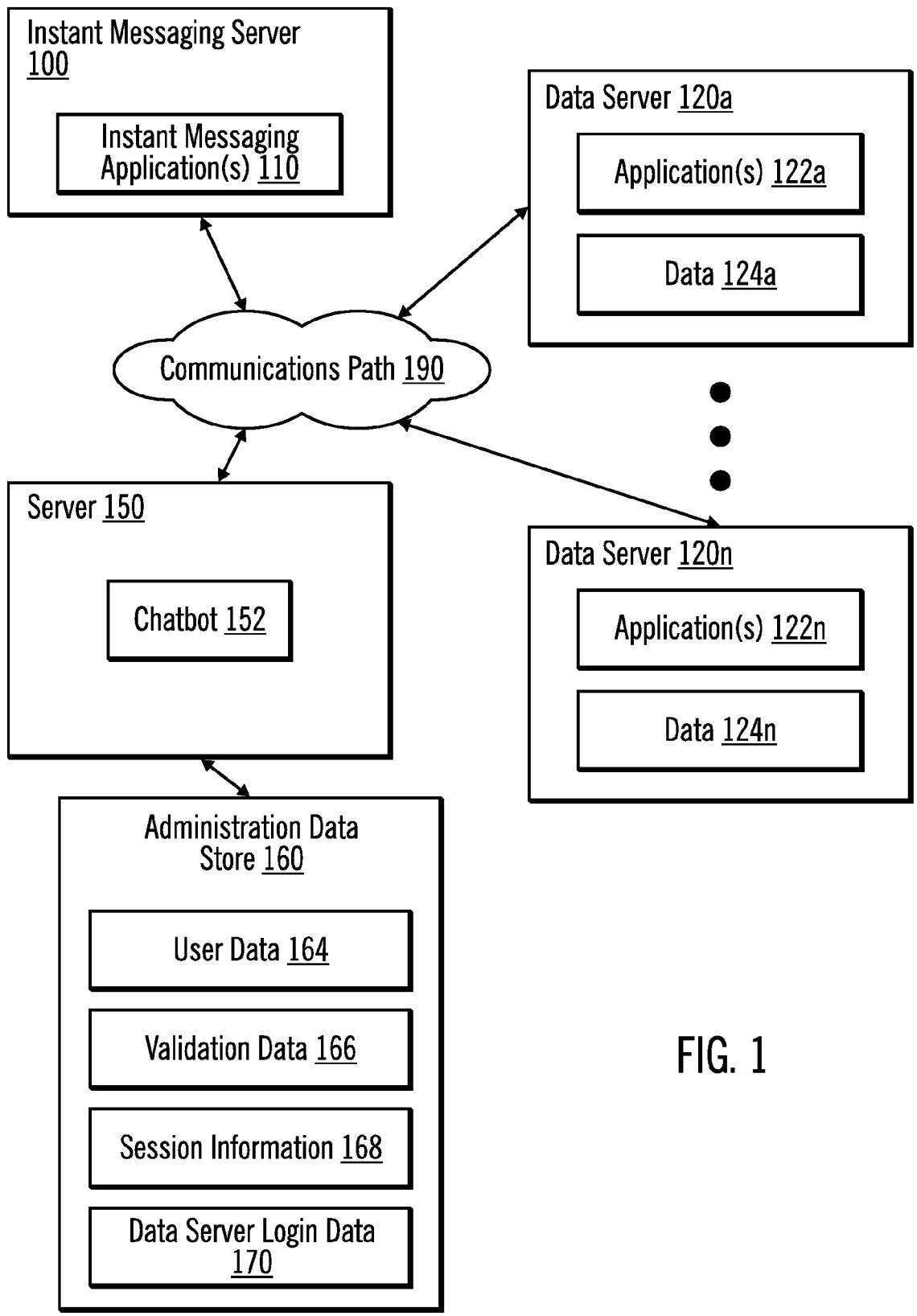
FIG. 1 illustrates details of a computing environment in accordance with certain embodiments.

FIG. 1 illustrates details of a computing environment in accordance with certain embodiments. An instant messaging server 100, data servers 120a . . . 120n (where a, n, and the ellipses are used to indicate that there may be any number of data servers in the computing environment), and server 150 are coupled to a communication path 190 and communicate with each other through the communication path 190.

The instant messaging server 100 includes one or more instant messaging applications 110 that manage the instant message communications between clients (e.g., between the server 150 and the data servers 120a . . . 120n). The instant messaging server 100 manages instant messaging communications. Instant messaging is sometimes referred to as "IM" or "IMing". Instant messaging may be described as an exchange of voice and/or text messages between two or more entities (e.g., users, a user and a software application, etc.) through a software application in real time over some communication path, such as the Internet. For example, the text may be typed into a chat window having two panes, one in which to type and enter text, and the other in which to view the exchanged text. Also, the text may be converted from voice to text via voice recognition software and from text to voice via text-to-speech software, enabling instant message communication to be implemented using speech. With embodiments, "real time" includes actual real time and near real time transfer, transmission, or communication.

Each data server 120a . . . 120n includes one or more applications 122a . . . 122n and data 124a . . . 124n. Data servers 120a . . . 120n may also be called Relational Database Management Systems (RDBMS), and, in some cases, are simply referred to as databases. However, embodiments use "data server" to refer to the software infrastructure that contains databases and facilitates access and management of the databases (e.g., including creating and deleting databases and manipulating data in databases).

The server 150 includes a chatbot 152 that enables a database administrator or other user to administer the data servers 120a . . . 120n via instant messaging. The server 150 is coupled to an administration data store 160 (e.g., a database). The chatbot 152 maintains user data 164, optionally maintains validation data 166, and maintains session information 168. In certain embodiments, the user data 164 includes user identifiers for users who are authorized to submit commands to particular data servers 120a . . . 120n to perform data server administration tasks. In certain embodiments, any user can connect to any existing data server 120a . . . 120n and, if a user defines a new data server by providing the "data server login data" (i.e., used to login to the newly defined data server), then the "data server login data" for the newly defined data server is stored for the user and used when that user wants to administer the newly defined data server. In certain embodiments, the validation data 166 includes user identifiers for users (i.e., the validation data 166 includes the contents of the user data 164) along with information about which data servers 120a . . . 120n each user can access (e.g., UserA can access ServerZ). In certain embodiments, the validation data 166 also includes information about particular commands that each user may issue to specific data servers 120a . . . 120n (e.g., UserA can issue a command to "check extents" on ServerZ). In certain embodiments, the chatbot 152 maintains the user data 164 and the validation data 166 in database tables. For example, the user data 165 may be a table of administration users and which data servers 120a . . . 120n they have administration rights to. As another example, the validation data 166 may be a table of administration users, the data servers 120a . . . 120n that they may administer, and commands that they may issue.

In certain embodiments, the session information 168 includes information about users who have initiated dialogs (i.e., connections) with the chatbot 152. In certain embodiments, users defined as administrators in the administration data store 160 can use the chatbot 152 and information about these users is stored in the session information 168; while other users (not defined as administrators in the administration data store 160) who attempt to communicate with the chatbot 152 are denied access, and information about them is not stored in the session information 168 unless administrators of the chatbot 152 choose to log access denied events. The session information 168 may also include session specific information, such as the current data server instance that is being administered. In certain embodiments, the chatbot 152 has access to the administration data store 160 (e.g., an administration database) and maintains a row in a table for each user whose session information 168 is to be stored.

The chatbot 152 also has access to data server login data 170 that is used to connect to one or more data servers 120a . . . 120n. The data server login data 170 may be predefined, may be defined by the user issuing commands via the chatbot 152 (in which case the login data is stored in the data server login data 170), or both.

The servers 100, 120a . . . 120n, 150 may each comprise any computing device known in the art, such as a server, mainframe, workstation, personal computer, hand held computer, laptop telephony device, network appliance, etc.

The communication path 190 may comprise any type of network, such as, for example, a peer-to-peer network, spoke and hub network, Storage Area Network (SAN), a Local Area Network (LAN), Wide Area Network (WAN), the Internet, an Intranet, etc.

Figure 2A:
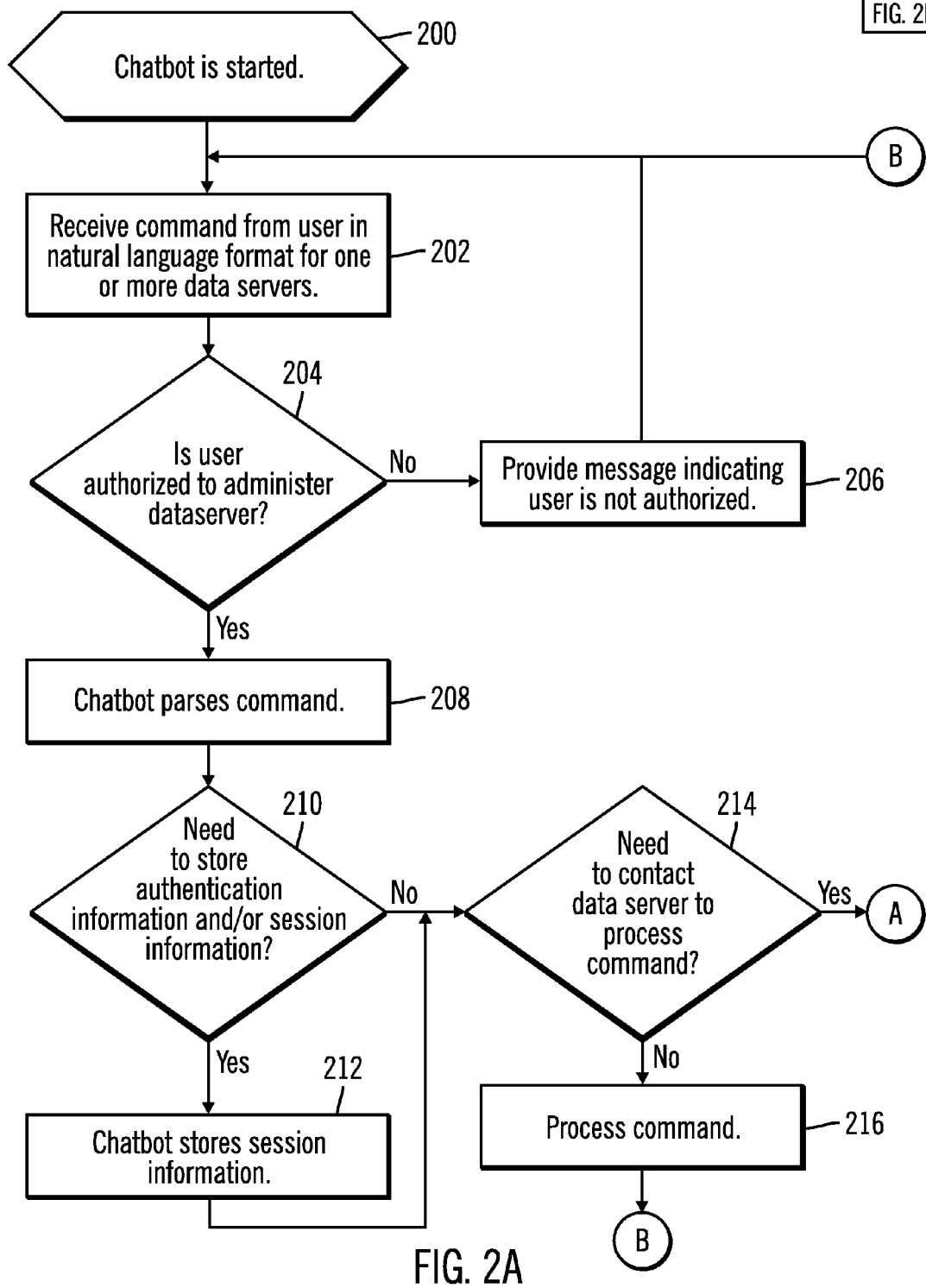
FIGS. 2A and 2B illustrate logic in accordance with certain embodiments.
Figure 2B:
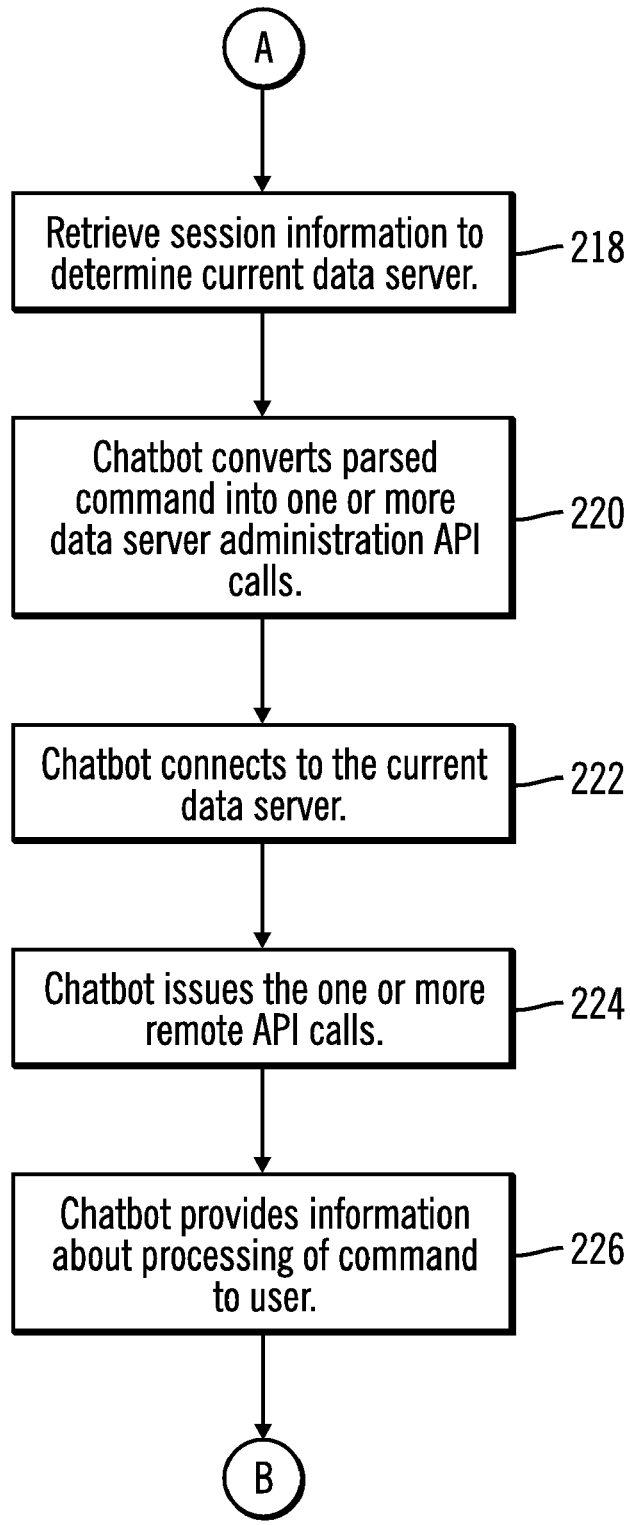

FIGS. 2A and 2B illustrate logic in accordance with certain embodiments. The processing of FIGS. 2A and 2B occurs in real time. Control beings at block 200 with the chatbot 152 being started. In certain embodiments, the chatbot 152 is started by a designated chatbot administrator and left to run unattended. That is, once started, the chatbot 152 runs continuously as a server program, except for unavoidable downtime, such as server maintenance and upgrades that may apply to any server program. The administrator may start the chatbot 152 manually or configure the operating system to start the chatbot 152 when the system is started. Once the chatbot 152 is started, the chatbot 152 logs onto a designated instant message network (e.g. one managed by the instant messaging server 100), where the chatbot 152 is visible to users of this network so that the users may initiate chat conversations with the chatbot 152.

In block 202, the chatbot 152 receives a command from a user in a natural language format to administer one or more data servers 120a . . . 120n. The command may configure one or more data servers 120a . . . 120n, retrieve information about one or more data servers, define new data servers 120a . . . 120n to administer, remove data servers 120a . . . 120n from a list of data servers 120a . . . 120n maintained in the administration data store 160, and otherwise administer one or more data servers. FIGS. 3A and 3B illustrate an example dialog 300, 310 in which configuration is performed in accordance with certain embodiments. In FIG. 3A, a user named Bowerman submits the command "help" to the chatbot 152 and receives information, including a list of commands that a user may submit. Then, user Bowerman defines a new data server in the format of "add server servername [machine] [port] [user] [passwd]") with the command "add server logos_1110 logos 9089 informix mypassword"). The chatbot 152 indicates that the data server has been added ("Server logos_ 1110 added") and sets that as the current data server to which additional commands will be applied until the current data server is changed. Next, user Bowerman requests that spaces be listed with the command "list spaces", and the chatbot 152 obtains a list of database spaces from the current data server and lists the database spaces. Then, user Bowerman requests that the data servers be listed with the command "list servers", and the chatbot 152 provides a list of defined data servers (e.g., using the user data 164 which identifies users and data servers 120a . . . 120n). User Bowerman changes the current server with the command "server marsh_1110", and the chatbot 152 indicates that the current server is marsh_1110. User Bowerman checks extents with the command "check extents", and the chatbot 152 validates the extents by contacting the current data server and provides an indication of success. That is, a command such as "validate extents" is translated to a specific data server administration API call to be executed after a connection to the current data server is made. The data server returns text information to the chatbot 152, which the chatbot 152 provides to the user. If a command was issued that translated to an API call that only returned a numeric return code to the chatbot 152, the chatbot 152 may indicate a message such as: "Command xxxx completed with return code y". User Bowerman issues a checkpoint with the command "checkpoint", and the chatbot 152 issues the checkpoint command to the current data server and returns an indication that the checkpoint completed.

In particular, a user (e.g., a database administrator) initiates a dialog with the chatbot 152 and submits a command in a natural language format for one or more data servers 120a . . . 120n. A natural language format may be described as a language written and/or spoken by humans (e.g., English or Japanese). That is, the user issues text based commands to instruct the chatbot 152 to perform specific data server administration tasks.

In block 204, the chatbot 152 determines whether the user is authorized to administer the one or more data servers 120a . . . 120n. If so, processing continues to block 208, otherwise, processing continues to block 206. In certain embodiments, the chatbot 152 makes the determination based on whether the user's identifier (used in initiating the dialog) matches an identifier in the user data 164, and, if that user identifier is authorized to access the particular one or more data servers 120a . . . 120n. In certain embodiments, the chatbot 152 maintains a list of valid (i.e., authorized) users and the data servers 120a . . . 120n that each of the users may administer in a database table (i.e., a form of user data 164), and, when a user on the instant message network initiates a conversation with the chatbot 152, the chatbot 152 validates the user's identifier against the list of valid users. In certain embodiments, the chatbot 152 makes the determination by checking the validation data 164 to determine whether this user is allowed to issue this command to the one or more data servers 120a . . . 120n specified with the command, and, if so, processing continues to block 208.

In block 206, the chatbot 152 provides a message indicating that the user is not authorized and processing continues to block 202.

In block 208, the chatbot 152 parses the command in the natural language format. In block 210, the chatbot 152 determines whether authentication information (i.e., data server login data 170) and/or session information 168 is to be stored. If so, processing continues to block 212, otherwise, processing continues to block 214. In block 212, the chatbot stores the authentication information and/or session information 168 and processing continues to block 214. For example, if the command is to "add server", the authentication information would be data server login data for the server to be added, and this data server login data is stored in the administration data store 160 and associated with the user who issued the command (e.g., "Bowerman"). Subsequently, user Bowerman may issue a "server" command to make this server the current server without having to provide authentication for this server again. However, in certain embodiments, other users would not be able to make this added server their current server without first issuing a valid command of "add server" or were otherwise listed as valid administrators for that newly added server.

In block 214, the chatbot 152 determines whether there is a need to contact a data server 120a . . . 120n to process the command. If so, processing continues to block 218 (FIG. 2B), otherwise, processing continues to block 216. In block 216, the chatbot 152 processes the command, as needed (without contacting the data server 120a . . . 120n), and processing loops back to block 202.

In block 218 (FIG. 2B), the chatbot 152 retrieves session information to determine the current data server (i.e., the data server to be contacted to process the command). In block 220, the chatbot 152 converts the parsed command into one or more data server administration API calls to remotely administrator one or more data servers 120a . . . 120n. In certain embodiments, for commands that translate to a remote API call, there is a direct conversion from a natural command to a connection to a data server 120a . . . 120n, followed by the execution of a specific API function with specific arguments.

In block 222, the chatbot 152 connects to the current data server 120a . . . 120n to which the one or more data server administration API calls are to be issued. To initiate a connection to a data server 120a . . . 120n, the chatbot 152 has access to data server login data 170. In certain embodiments, the data server login data 170 is a table containing login credentials to each data server 120a . . . 120n. This information may be secured by appropriate encryption or other means. The chatbot 152 may also maintain a log database or file recording each connecting user's actions.

In block 224, the chatbot 152 issues the one or more data server administration API calls to the one or more data servers 120a . . . 120n. In block 216, the chatbot 152 provides information about processing of the command to the user (e.g., the command was executed successfully). From block 226, processing loops back to block 202 (FIG. 2A).

Merely to enhance understanding of embodiments, examples will be provided with reference to FIGS. 2A and 2B. Consider the following Sequence(1) between user Bowerman and the chatbot 152:

Sequence(1)
Bowerman: add server logos__1110 logos 9089 informix mypassword
chatbot: Server logos__1110 added.
Current server: logos__1110

For the command in Sequence(1) from user Bowerman ("add server logos__1110 logos 9089 informix mypassword"), the chatbot 152 processing flows through blocks 202, 204, 208, 210, 212, 214, and 216. In this example, the chatbot 152 stores authentication information and session information (i.e., the session information indicates that the current data server for this user Bowerman is called logos__1110), and no other processing is needed in block 216.

As another example, consider the following Sequence(2) between user Bowerman and the chatbot 152:
Sequence(2)
bowerman: check extents
chatbot: Validating extents for Space 'rootdbs' . . .

For the command in Sequence(2) from user Bowerman ("check extents"), the chatbot 152 processing flows through blocks 202, 204, 208, 210, 214, 218, 220, 222, 224, and 226.

Thus, with embodiments, the chatbot 152 may include a parser that may be programmed to accept commands identical or similar to the command line administration commands provided by a data server 120a . . . 120n for use on the machine where the server was installed, which means a user (e.g., a DataBase Administrator (DBA)) does not need to learn a new set of commands. Also, instant message communication has accessibility advantages because many instant message clients support text to speech conversion and voice recognition. Moreover, with embodiments, user authentication is handled by the instant message network, so once a valid user has been given access to the instant message network (defined to the application), no additional authentication is required. That is, if a user is logged onto the instant message network, the user has already provided a valid user identifier ("user id") and password once to the instant message server 100, so, particularly for a corporate intranet running a secure instant message system, the chatbot 152 knows who the user is and that they are authenticated to access the instant message network. Thus, the user does not need to provide a user id and password to the chatbot 152. In addition, interaction with the user may be presented in a more human-friendly dialog via the chatbot 152.

In certain embodiments, the chatbot 152 may be written using development tools provided for developing instant message clients. For example a chatbot communicating over an IBM® Lotus® Sametime® network may be written in Java® using the IBM® Lotus® Sametime® Software Development Kit (SDK). (IBM, Lotus, and Sametime are trademarks of International Business Machines Corporation in the United States, other countries, or both.) (Java is a trademark of Sun Microsystems in the United States, other Countries, or both.) The chatbot 152 then communicates with data server instances using provided administration APIs. For example a Java® based chatbot may administer an Informix® data server using Java® DataBase Connectivity (JDBC®) calls to the Informix® Structured Query Language (SQL) Admin API. (JDBC is a trademark of Sun Microsystems in the United States, other Countries, or both.) (Informix is a trademark of International Business Machines Corporation in the United States, other countries, or both.)

FIG. 4 illustrates an example dialog 400 following a connection by user "Fred" in accordance with certain embodiments. For example, when "Fred" attempts to administer the hr_instance, the chatbot 152 indicates: "Current instance set to hr_instance" (i.e., Fred is authorized to administer the hr_instance data server). On the other hand, when "Fred" attempts to administer the payroll data sever, the chatbot 152 indicates: "You are not in the valid administrator list for the payroll instance". Also, "Fred" is able to submit commands in a natural language format (e.g., "list chunks").

The availability of data server administration APIs that may be accessed remotely means that the chatbot 152 may run on any machine that can make a network connection to both the instant message network and the selected data server. Data servers that support running an application server within the data server may additionally support running a dedicated chatbot 152 that administers a single instance. Moreover, the chatbot 152 has the flexibility of switching between data servers with simple commands.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may comprise a receiver or transmitter device or other physical carrier capable of processing or implementing the code as "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2A and 2B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2A and 2B may be implemented in software, hardware, programmable and non-programmable gate array logic or in some combination of hardware, software, or gate array logic.

Figure 5:
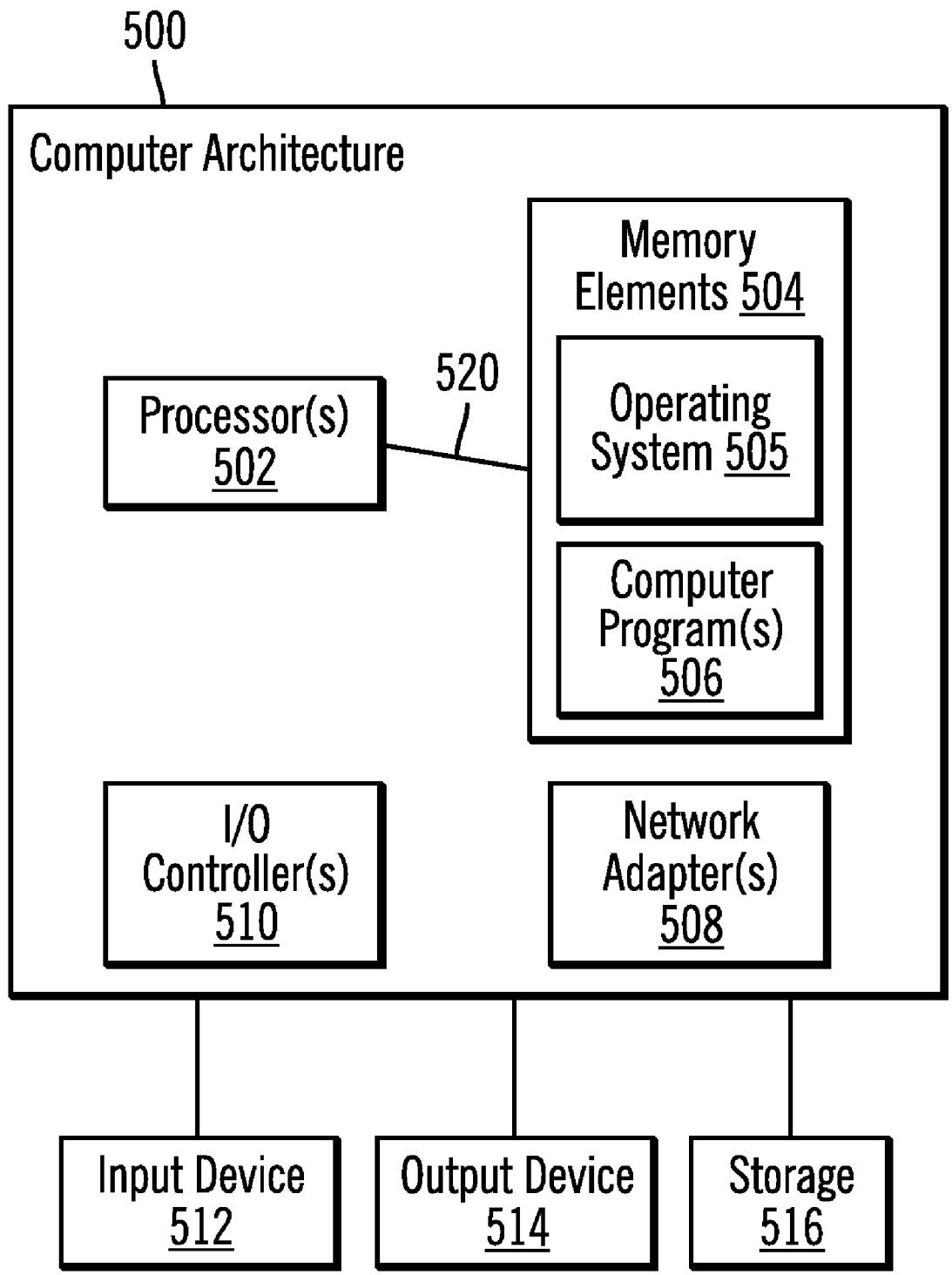
FIG. 5 illustrates a system architecture that may be used in accordance with certain embodiments.

FIG. 5 illustrates a system architecture 500 that may be used in accordance with certain embodiments. One or more of the servers 100, 120a . . . 120n, 150 may implement system architecture 500 or a similar architecture. The system architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The system architecture 500 may be coupled to storage 516 (e.g., a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The system architecture 500 may include fewer components than illustrated, additional components not illustrated herein, or some combination of the components illustrated and additional components. The system architecture 500 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:
    under control of a chatbot coupled to an instant message network, in real time, wherein the chatbot runs on a machine connected to the instant message network, and wherein the chatbot switches between data servers with commands,
    receiving a command to perform a data server administration task from a user for administering a data server in a natural language format to perform one of configuring the data server, removing the data server, adding a new data server, and retrieving information about the data server;
    determining whether the data server is to be contacted to process the command based on whether the chatbot is able to process the command;
    in response to determining that the data server is to be contacted:
        converting the command in the natural language format into one or more data server administration Application Programming Interface (API) calls;
        performing remote administration of the data server by issuing the one or more data server administration API calls to the data server for processing by the data server; and
        in response to receiving information from the data server, providing the information about processing of the command to the user; and
    in response to determining that the data server does not need to be contacted,
        processing the command without contacting the data server, wherein the command consists of one of a request for help information to obtain a list of commands, a request to set a current data server to which commands are applied until the current data server is changed, and a request for a list of data servers; and
        returning a response to the command by providing one of the list of commands, an indication that the current data server is set, and the list of data servers.

2. The method of claim 1, further comprising:
    storing at least one of authentication information and session information for each user who initiates a dialog with the chatbot.

3. The method of claim 1, further comprising:
    determining whether the user is authorized to issue the command to the data server;
    in response to determining that the user is authorized, determining whether the data server is to be contacted to process the command; and
    in response to determining that the user is not authorized, providing a message that the user is not authorized.

4. The method of claim 1, further comprising:
    parsing the command in the natural language format.

5. The method of claim 1, further comprising:
    connecting to the data server using stored data server login data.

6. A computer program product comprising a computer-readable storage medium including a computer readable program, wherein the computer readable storage medium is a member of a set of computer readable storage media consisting of a semiconductor or solid state memory, magnetic tape, a removable computer diskette, a rigid magnetic disk, an optical disk, a magnetic storage medium, and volatile and non-volatile memory devices, wherein the computer readable program when executed by a processor on a computer causes the computer to:
    under control of a chatbot in-coupled to an instant message network, in real time, wherein the chatbot switches between data servers with commands,
    receive a command to perform a data server administration task from a user for administering a data server in a natural language format to perform one of configuring the data server, removing the data server, adding a new data server, and retrieving information about the data server;
    determine whether the data server is to be contacted to process the command based on whether the chatbot is able to process the command;
    in response to determining that the data server is to be contacted:
        convert the command in the natural language format into one or more data server administration Application Programming Interface (API) calls;
        perform remote administration of the data server by issuing the one or more data server administration API calls to the data server for processing by the data server; and
    in response to receiving information from the data server, provide the information about processing of the command to the user; and
    in response to determining that the data server does not need to be contacted,
        process the command without contacting the data server, wherein the command consists of one of a request for help information to obtain a list of commands, a request to set a current data server to which commands are applied until the current data server is changed, and a request for a list of data servers; and
        return a response to the command by providing one of the list of commands, an indication that the current data server is set, and the list of data servers.

7. The computer program product of claim 6, wherein the computer readable program when executed on a computer causes the computer to:
    store at least one of authentication information and session information for each user who initiates a dialog with the chatbot.

8. The computer program product of claim 6, wherein the computer readable program when executed on a computer causes the computer to:
    determine whether the user is authorized to issue the command to the data server;

in response to determining that the user is authorized, determine whether the data server is to be contacted to process the command; and in response to determining that the user is not authorized, provide a message that the user is not authorized.

9. The computer program product of claim 6, wherein the computer readable program when executed on a computer causes the computer to:

parse the command in the natural language format.

10. The computer program product of claim 6, wherein the computer readable program when executed on a computer causes the computer to:

connect to the data server using stored data server login data.

11. A system, comprising:

a processor, and storage coupled to the processor, wherein the storage stores a program, wherein the processor executes the program to perform operations, the operations comprising:

under control of a chatbot coupled to an instant message network, in real time, wherein the chatbot switches between data servers with commands, receiving a command to perform a data server administration task from a user for administering a data server in a natural language format to perform one of configuring the data server, removing the data server, adding a new data server, and retrieving information about the data server;

determining whether the data server is to be contacted to process the command based on whether the chatbot is able to process the command;

in response to determining that the data server is to be contacted:

converting the command in the natural language format into one or more data server administration Application Programming Interface (API) calls;

performing remote administration of the data server by issuing the one or more data server administration API calls to the data server for processing by the data server;

in response to receiving information from the data server, providing the information about processing of the command to the user; and in response to determining that the data server does not need to be contacted, processing the command without contacting the data server, wherein the command consists of one of a request for help information to obtain a list of commands, a request to set a current data server to which commands are applied until the current data server is changed, and a request for a list of data servers; and returning a response to the command by providing one of the list of commands, an indication that the current data server is set, and the list of data servers.

12. The system of claim 11, wherein the operations further comprise:

storing at least one of authentication information and session information for each user who initiates a dialog with the chatbot.

13. The system of claim 11, wherein the operations further comprise:

determining whether the user is authorized to issue the command to the data server;

in response to determining that the user is authorized, determining whether the data server is to be contacted to process the command; and in response to determining that the user is not authorized, providing a message that the user is not authorized.

14. The system of claim 11, wherein the operations further comprise:

parsing the command in the natural language format.

15. The system of claim 11, wherein the operations further comprise:

connecting to the data server using stored data server login data.

* * * * *